United States Patent [19]
Cook

[11] Patent Number: 6,084,727
[45] Date of Patent: Jul. 4, 2000

[54] ALL-REFLECTIVE FIELD-SWITCHING OPTICAL IMAGING SYSTEM

[75] Inventor: Lacy G. Cook, El Segundo, Calif.

[73] Assignee: Raytheon Company, Lexington, Mass.

[21] Appl. No.: 09/301,059

[22] Filed: Apr. 28, 1999

[51] Int. Cl.[7] ................................................. G02B 5/08
[52] U.S. Cl. .......................... 359/850; 359/851; 359/364; 359/366
[58] Field of Search ..................... 359/850, 851, 359/852, 854, 856, 857, 861, 364, 365, 366, 388

[56] References Cited

U.S. PATENT DOCUMENTS

| | | | |
|---|---|---|---|
| 3,674,334 | 7/1972 | Offner | 359/366 |
| 5,106,196 | 4/1992 | Brierley | 356/445 |

*Primary Examiner*—Cassandra Spyrou
*Assistant Examiner*—Mohammad Y. Sikder
*Attorney, Agent, or Firm*—Colin M. Raufer; Leonard A. Alkov; Glenn H. Lenzen, Jr.

[57] ABSTRACT

An all-reflective field-switching optical imaging system includes an optical beam coincident with an optical axis and forming a nominal pupil, a pupil-reimaging mirror array spatially separated from the optical axis and having an incident beam with a first pupil the same size as the nominal pupil and an output beam with a second pupil, and a beam diverter mirror array controllably movable between a first position where the beam diverter mirror array does not intercept the optical axis and does not divert the optical beam, and a second position where the beam diverter mirror array intercepts the optical axis and diverts the optical beam. The beam diverter mirror array has a first beam diverter mirror positioned so as to direct the optical beam to the pupil-reimaging mirror array as its incident beam, when the first beam diverter mirror intercepts the optical axis, and a second beam diverter mirror positioned so as to receive the output beam from the pupil-reimaging mirror array and reflect the output beam so as to be coaxial with the optical axis and with the second pupil lying at the pupil plane so as to be concentric and coplanar with a location of the nominal pupil when the beam diverter mirror array is in the first position, when the second beam diverter mirror intercepts the optical axis.

17 Claims, 1 Drawing Sheet

ALL-REFLECTIVE FIELD-SWITCHING OPTICAL IMAGING SYSTEM

BACKGROUND OF THE INVENTION

This application relates to an all-reflective optical imaging system and, more particularly, to such a system which permits changing the field of view while maintaining the pupil location of the imaging system.

An optical imaging system typically includes optical components that focus an incident optical beam to a sensing device at a focal plane. A sensor, image recording device, or other component is located at the focal plane to utilize the focused optical beam. The imaging system may be required to be operable at a single wavelength or in a narrow wavelength range, and either reflective or refractive optics may be used.

The imaging system may instead be required to be operable over a wide range of wavelengths such as, for example, both visible and infrared wavelength ranges. In that case, refractive optics generally cannot be used, because the lenses have wavelength-dependent focal lengths and aberrations. The focal plane location of a refractive imaging system varies as a function of the wavelength of the radiation, complicating or degrading the imaging process. Accordingly, all-reflective imaging systems are preferred for these wide-band applications, because the focal length and aberrations of a mirror system are independent of the wavelength of the incident radiation.

Another requirement of some optical imaging systems is the ability to change the field of view between two or more fields (termed "field-switching"), such as a lower-magnification, wider-angle view, and a higher-magnification, narrower-angle view. For example, some sensor systems perform initial acquisition scans with the wide-angle view, and then switch to the narrow-angle view once a target has been located.

Field-switching optical imaging devices are widely available for refractive systems, zoom lenses being a common example. In these devices, lenses or groups of lenses are moved relative to each other to effect the field switching. However, structures to achieve comparable results for all-reflective optical imaging devices are not available. There is, accordingly, a need for an all-reflective optical imaging system with field-switching capability and which maintains the pupil location fixed as the field of view changes. The present invention fulfills this need, and further provides related advantages.

SUMMARY OF THE INVENTION

The present invention provides an all-reflective field-switching optical imaging system. Only reflective components are used in the field-switching optics, so that the optical imaging system may be used over a wide range of wavelengths of incident energy. In particular, the field-switching imaging system may be used for both visible light and infrared energy. The pupil location of the optical imaging system remains stationary as the field of view is changed, although the size of the pupil varies inversely with the field of view. The imaging system is mechanically simple and reliable, and does not require modification of the positions of the components that accomplish the change in the field of view.

In accordance with the invention, an all-reflective field-switching optical imaging system is used with an optical device having a substantially collimated optical beam coincident with an optical axis and forming a nominal pupil at a pupil plane. The optical imaging system comprises a pupil-reimaging mirror array spatially separated from the optical axis and having an incident beam with a first pupil and an output beam with a second pupil, and a beam diverter mirror array controllably movable between a first position where the beam diverter mirror array does not intercept the optical axis and does not divert the optical beam, and a second position where the beam diverter mirror array intercepts the optical axis and diverts the optical beam. The beam diverter mirror array includes a first beam diverter mirror positioned so as to direct the optical beam to the pupil-reimaging mirror array as its incident beam with the first pupil the same size as the nominal pupil, when the first beam diverter mirror intercepts the optical axis, and a second beam diverter mirror positioned so as to receive the output beam of the pupil-reimaging mirror array and reflect the output beam so as to be coaxial with the optical axis, and with the second pupil concentric and coplanar with a location of the nominal pupil when the beam diverter mirror array is in the first position, when the second beam diverter mirror intercepts the optical axis.

The incident optical beam may be of any type that is substantially collimated and proceeds along an optical axis and forms a nominal pupil. Such an incident optical beam may be furnished from any operable optical source.

The pupil-reimaging mirror array is preferably an anastigmat mirror array. The anastigmat mirror array typically has an odd number of mirrors, such as a three-mirror anastigmat, a five-mirror anastigmat, or a seven-mirror anastigmat. The pupil-reimaging mirror array alters the field of view and the pupil of the introduced beam according to the selected mirrors, so that its second pupil output may be the same as or different than its first pupil input (and the nominal pupil). If different, the second pupil may be larger or smaller than the first pupil (and the nominal pupil). The size of the pupil is inversely proportional to the field of view. The geometry of the pupil-reimaging mirror array remains fixed, as it is not necessary to alter the relative positions of the mirrors or the geometry of the mirrors. No motors or other activating devices are required for the pupil-reimaging mirror array, and it is manufactured and assembled with the required unvarying tolerances. No refractive optical elements are used in the pupil-reimaging mirror array.

The beam diverter mirror array includes two mirror elements, which are preferably flat mirrors that may be controllably positioned to intercept the optical axis of the incident beam. When active and in its second position, the first beam diverter mirror diverts the incident optical beam into the input of the pupil-reimaging mirror array. The second beam diverter mirror receives the output beam of the pupil-reimaging mirror array and directs it to the pupil plane so as to be concentric and coplanar with the location that the nominal pupil occupies when the beam diverter mirror array is in its first position. The field switching is accomplished simply by pivoting or translating the beam diverter mirror array between its two positions. No refractive optical elements are used in the beam diverter mirror array.

Thus, the pupil-reimaging mirror array remains fixed in orientation, location, and geometry, and the field-switching is accomplished by moving the two mirrors of the beam diverter mirror array into the second or diverting position. Field-switching back to the original field is accomplished by moving the two mirrors of the beam diverter mirror array to the first position where the two mirrors do not intercept the incident beam.

The present invention thus provides a mechanically straightforward, all-reflective structure to accomplish field switching between two fields of view. Switching between other fields of view may be accomplished by providing additional pupil-reimaging mirror arrays having suitable mirrors and geometries for other fields of view. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
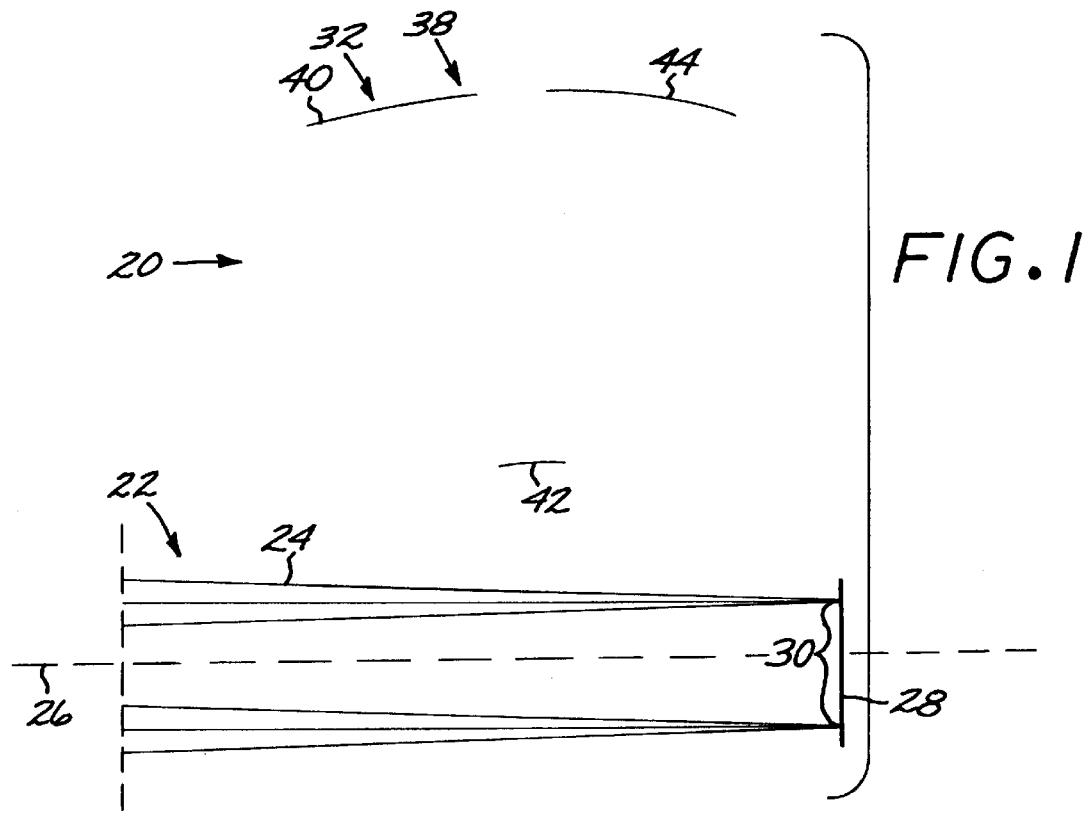
FIG. 1 is a schematic ray-path diagram of a preferred embodiment of the invention, with the beam diverter mirror array in its first, nonintercepting position.
Figure 2:
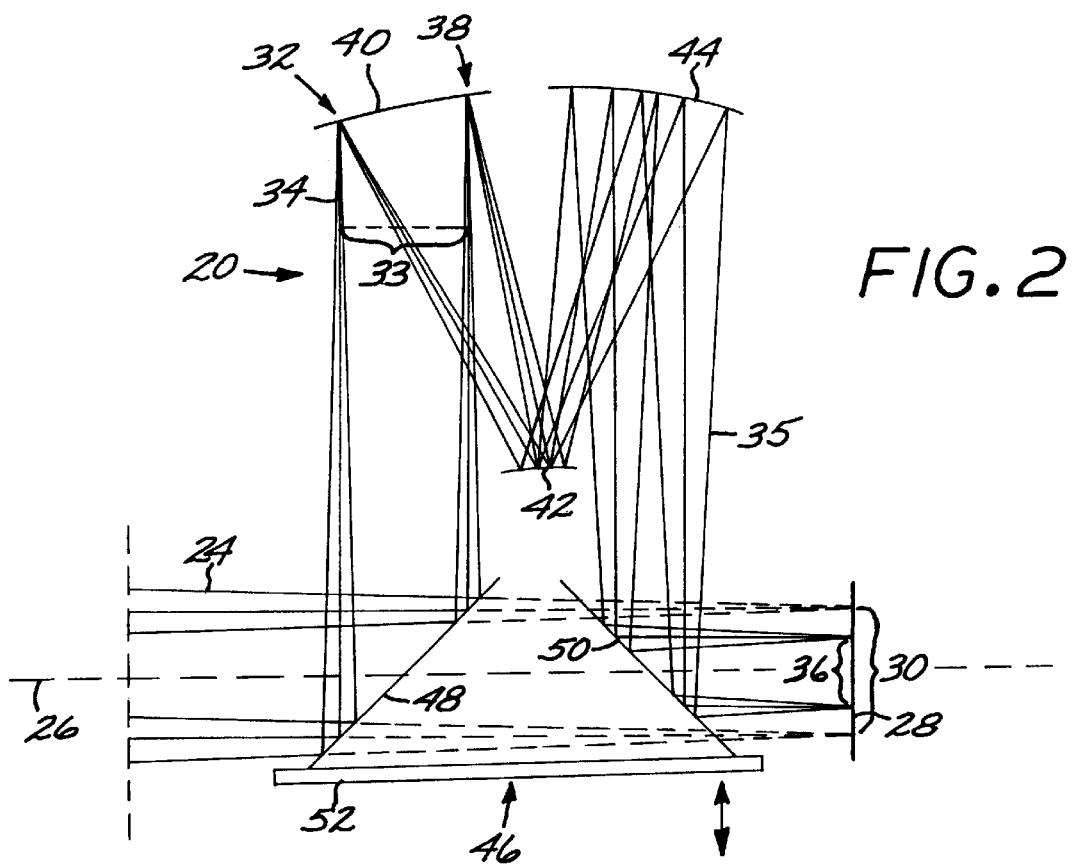
FIG. 2 is a schematic ray-path diagram of the preferred embodiment of the invention as illustrated in FIG. 1, except with the beam diverter mirror array in its second, diverting position.

FIGS. 1 and 2 illustrate an all-reflective field-switching optical imaging system 20, in a first position (FIG. 1) producing a first field of view and a nominal pupil, and a second position (FIG. 2) producing a second field of view and a second pupil. As shown in FIG. 1, the optical imaging system 20 is used in conjunction with an optical beam 24 that is coincident with an optical axis 26. The optical beam 24 forms a nominal pupil 30 at a pupil plane 28 associated with a first field of view. The optical beam 24 may be formed by any operable optical source, positioned to the left of the structure of FIGS. 1 and 2. Examples include a refractive telescope or a set of mirrors that directs and collimates the optical beam 24 to form the nominal pupil 30 at the pupil plane 28.

FIG. 2 illustrates the optical imaging system 20 configured to produce a second pupil and a second field of view. The optical imaging system 20 includes a pupil-reimaging mirror array 32 that is spatially separated from the optical axis 26. In this case, the optical imaging system 20 is spaced laterally apart from the optical axis 26 in a direction perpendicular to the optical axis 26. The pupil-reimaging mirror array 32 is positioned so that it not intercepted by the optical beam 24, unless the optical beam is diverted as will be described subsequently.

The pupil-reimaging mirror array 32 has an incident beam 34 having a first pupil 33, which is the same size as the nominal pupil 30. The pupil-reimaging mirror array has an output beam 35 having a second pupil 36. The second pupil 36 may be of the same size as the first pupil 33 and the nominal pupil 30, but more preferably is either smaller or larger than the first pupil 33 and the nominal pupil 30.

The pupil-reimaging mirror array 32 may be of any operable type. The pupil-reimaging mirror array 32 preferably has an odd number of mirrors, such as one mirror, three mirrors, five mirrors, seven mirrors, and so on. There is little practical interest in a one-mirror array because it does not change the field of view. The mirror array 32 therefore preferably has three or more mirrors. Also preferably, the pupil-reimaging mirror array 32 is an anastigmat. Most preferably, the pupil-reimaging mirror array is a three-mirror anastigmat 38 as illustrated, but five-mirror anastigmats and seven-mirror anastigmats may also be employed in some applications.

Three-mirror anastigmats are known in the art for other applications and are described, for example, in U.S. Pat. No. 3,674,334, whose disclosure is incorporated by reference. In the preferred three-mirror anastigmat 38, the incident beam 34 having the first pupil 33 is directed to a primary mirror 40, is reflected therefrom to a secondary mirror 42, and is reflected therefrom to a tertiary mirror 44. The primary mirror 40 is preferably parabolic, the secondary mirror 42 is preferably hyperbolic, and the tertiary mirror 44 is preferably parabolic. These mirrors 40, 42, and 44 cooperate to re-image the incident beam 34 to a different pupil and field of view, here the second pupil 36. The change in the pupil of the preferred three-mirror anastigmat 38 from the first pupil 33 of the incident beam 34 to the second pupil 36 may be calculated utilizing techniques well known in the art and described, for example, in "Reflective Optics" by Dietrich Korsch, Academic Press, 1991, see particularly Chapter 9. These calculational techniques also provide the optical prescriptions for the mirrors 40, 42, and 44 in the case of the three-mirror anastigmat.

A beam diverter mirror array 46, shown in FIG. 2, is provided to direct the optical beam 24 from its path coincident with the optical axis 26 and into the pupil-reintaging mirror array 32 as its incident beam 34. The beam diverter mirror array 46 also directs the output beam 35 of the pupil-reimaging mirror array 32 to the second pupil 36, which is concentric with and coplanar with the nominal pupil 30 at the pupil plane 28. The beam diverter 46 is selectively and controllably movable between a first position wherein its mirrors do not intercept the optical axis 26 and the optical beam 24, illustrated in FIG. 1 with the beam diverter 46 not visible, and a second position where its mirrors intercept the optical axis 26 and the optical beam 24, and divert the optical beam 24 into the pupil-reimaging mirror array 32 as its incident beam 34.

The beam diverter mirror array 46 preferably is formed as two flat mirrors. A first beam diverter mirror 48 is positioned so as to direct the optical beam 24 to the pupil-reimaging mirror array 32 as its incident beam 34, when the first beam diverter mirror 48 intercepts the optical axis 26. In this folding of the optical beam 2, the first pupil 33 is formed at the same distance from the first beam diverter mirror 48 as the nominal pupil 30. A second beam diverter mirror 50 is positioned so as to receive the output beam 35 of the pupil-reimaging mirror array 32 and reflect the output beam 35 so as to be coaxial with the optical axis 26, and so that tire second pupil 36 is concentric and coplanar with the nominal pupil 30 at the pupil plane 28, when the second beam diverter mirror 50 intercepts the optical axis 26. In FIG. 2, the dashed lines depict the continuation of the optical beam 24 to the nominal pupil 30, which is not actually present because the beam is diverted by the first beam diverter mirror 48, but is illustrated to allow a comparison of the positions of the positions and sizes of the pupils 30 and 36.

The diverter mirrors 48 and 50 are mounted to an appropriate support 52, in the illustrated case a translating support that selectively and controllably moves radially toward and away from the optical axis 26. In the illustrated case, the mirrors 48 and 50 are oriented at about 45 degrees to the optical axis 26 to reflect the beams 24 and 35 at right angles. A rotational support may be used instead.

By positioning the mirrors 48 and 50 of the beam diverter mirror array 46 in the illustrated manner, the second pupil 36 is concentric with the nominal pupil 30. Consequently, the location of the pupil does not change when the field of view is switched, an important advantage because it simplifies analysis of the image at the focal plane (not visible) when the field of view is switched. The mirrors of the pupil-reimaging mirror array 32 do not move at all, and the mirrors of the beam diverter mirror array 46 move only as a rigid body securely mounted to the support 52. The field-switching optical imaging system 20 is therefore robust and not sensitive to shock, vibration, temperature changes, and other effects which adversely affect the performance of other types of field-switching apparatus. Because they use only reflective components, the pupil-reimaging mirror array 32 and the beam diverter 46 are operable over a wide range of wavelengths of the optical beam 24, without wavelength-induced changes in the imagery.

The approach of the invention has been reduced to practice using the general approach illustrated in FIGS. 1–2, and has operated satisfactorily.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An all-reflective field-switching optical imaging system for use with an optical device having a substantially collimated optical beam coincident with an optical axis and forming a nominal pupil at a pupil plane, the optical imaging system comprising:

a pupil-reimaging mirror array spatially separated from the optical axis and having an incident beam with a first pupil and an output beam with a second pupil; and a beam diverter mirror array comprising a first beam diverter mirror and a second beam diverter mirror; said beam diverter mirror array directs said optical beam from its path coincident with said optical axis and into said pupil-reimaging mirror array as said incident beam, and controllably movable between a first position where the beam diverter mirror array does not intercept the optical axis and does not divert the optical beam, and a second position where the beam diverter mirror array intercepts the optical axis and diverts the optical beam;

said first beam diverter mirror positioned so as to direct the optical beam to the pupil-reimaging mirror array as its incident beam with the first pupil the same size as the nominal pupil, when the first beam diverter mirror intercepts the optical axis, and said second beam diverter mirror positioned so as to receive the output beam of the pupil-reimaging mirror array and reflect the output beam so as to be coaxial with the optical axis, and with the second pupil concentric and coplanar with a location of the nominal pupil when the beam diverter mirror array is in the first position, when the second beam diverter mirror intercepts the optical axis.

2. The optical imaging system of claim 1, wherein the pupil-reimaging mirror array comprises at least three pupil-imaging mirrors.

3. The optical imaging system of claim 1, wherein the pupil-reimaging mirror array comprises an anastigmat mirror array.

4. The optical imaging system of claim 1, wherein the pupil-reimaging mirror array comprises a three-mirror anastigmat mirror array.

5. The optical imaging system of claim 1, wherein the pupil-reimaging mirror array comprises an odd number of pupil-imaging mirrors.

6. The optical imaging system of claim 1, wherein the second pupil has a different size than the nominal pupil.

7. The optical imaging system of claim 1, wherein the first beam diverter mirror and the second beam diverter mirror are each a planar mirror.

8. The optical imaging system of claim 1, wherein the second pupil is smaller than the nominal pupil.

9. The optical imaging system of claim 1, wherein the first beam diverter mirror and the second beam diverter mirror each intercept the beam axis at an angle of about 45 degrees, when the beam diverter mirror array is in the second position.

10. The optical imaging system of claim 1, further including the optical device having the optical beam coincident with the optical axis and focused with the nominal pupil at the pupil plane.

11. An all-reflective field-switching optical imaging system for use with an optical device having a substantially collimated optical beam coincident with an optical axis and forming a nominal pupil at a pupil plane, the optical imaging system comprising:

an anastigmat mirror array spatially separated from the optical axis and having an incident beam with a first pupil and an output beam with a second pupil; and a beam diverter mirror array comprising a first beam diverter planar mirror and a second beam diverter planar mirror; said beam diverter mirror array directs said optical beam from its path coincident with said optical axis and into said anastigmat mirror array as said incident beam, and controllably movable between a first position where the beam diverter mirror array does not intercept the optical axis and does not divert the optical beam, and a second position where the beam diverter mirror array intercepts the optical axis and diverts the optical beam, said first beam diverter planar mirror positioned so as to direct the optical beam to the pupil-reimaging mirror array as its incident beam with the first pupil the same size as the nominal pupil, when the first beam diverter planar mirror intercepts the optical axis, and said second team diverter planar mirror positioned so as to receive the output beam of the pupil-reimaging mirror array and reflect the output beam so as to be coaxial with the optical axis, and with the second pupil concentric and coplanar with a location of the nominal pupil when the beam diverter mirror array is in the first position, when the second beam diverter planar mirror intercepts the optical axis.

12. The optical imaging system of claim 11, wherein the anastigmat mirror array comprises an odd number of mirrors, and wherein the odd number is at least three.

13. The optical imaging system of claim 11, wherein the anastigmat mirror array comprises a three-mirror anastigmat mirror array.

14. The optical imaging system of claim 11, wherein the second pupil has a different size than the nominal pupil.

15. The optical imaging system of claim 11, wherein the second pupil is smaller than the nominal pupil.

16. The optical imaging system of claim 11, wherein the first beam diverter planar mirror and the second beam diverter planar mirror each intercept the beam axis at an angle of about 45 degrees, when the beam diverter mirror array is in the second position.

17. The optical imaging system of claim 11, further including the optical device having the optical beam coincident with the optical axis and focused with the nominal pupil at the pupil plane.

* * * * *